(12) United States Patent
Ray et al.

(10) Patent No.: US 8,538,370 B2
(45) Date of Patent: Sep. 17, 2013

(54) EMERGENCY MESSAGE BUTTON AND METHOD ON A WIRELESS COMMUNICATIONS DEVICE FOR COMMUNICATING AN EMERGENCY MESSAGE TO A PUBLIC SAFETY ANSWERING POINT (PSAP)

(75) Inventors: Amar Nath Ray, Shawnee, KS (US); Carl M. Coppage, Kansas City, MO (US); Lynn T. Greene, Olathe, KS (US); Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 630 days.

(21) Appl. No.: 12/257,674

(22) Filed: Oct. 24, 2008

(65) Prior Publication Data

US 2010/0003951 A1 Jan. 7, 2010

Related U.S. Application Data

(60) Provisional application No. 61/078,123, filed on Jul. 3, 2008.

(51) Int. Cl.
*H04M 11/04* (2006.01)
*H04M 1/00* (2006.01)

(52) U.S. Cl.
USPC .................. 455/404.1; 455/404.2; 455/550.1

(58) Field of Classification Search
USPC ...................................................... 455/404.1
See application file for complete search history.

(56) References Cited

U.S. PATENT DOCUMENTS

| | | | |
|---|---|---|---|
| 5,339,351 | A | 8/1994 | Hoskinson et al. |
| 5,379,337 | A | 1/1995 | Castillo et al. |
| 5,497,149 | A | 3/1996 | Fast |
| 5,555,286 | A | 9/1996 | Tendler |
| 5,646,987 | A | 7/1997 | Gerber et al. |
| 5,710,803 | A | 1/1998 | Kowal et al. |
| 5,936,622 | A | 8/1999 | Halverson et al. |
| 5,941,930 | A | 8/1999 | Morimoto et al. |
| 6,240,285 | B1 | 5/2001 | Blum et al. |
| 6,317,049 | B1 | 11/2001 | Toubia et al. |
| 6,366,772 | B1 | 4/2002 | Arnson |
| 6,377,169 | B1* | 4/2002 | Yanagisawa .................. 340/504 |
| 6,405,033 | B1 | 6/2002 | Kennedy et al. |
| 6,415,018 | B1 | 7/2002 | Antonucci et al. |
| 6,424,908 | B2 | 7/2002 | Urban et al. |
| 6,456,695 | B2* | 9/2002 | Lee ................................ 379/41 |
| 6,480,578 | B1 | 11/2002 | Allport |
| 6,526,125 | B1 | 2/2003 | Lindsay et al. |

(Continued)

OTHER PUBLICATIONS

Response filed Nov. 2, 2010 for U.S. Appl. No. 11/891,784.

(Continued)

*Primary Examiner* — Lester Kincaid
*Assistant Examiner* — Andy Gu
(74) *Attorney, Agent, or Firm* — Swanson & Bratschun, L.L.C.

(57) ABSTRACT

A wireless communications device including a housing, a user interface configured to enable a user to type text messages for communication over a communications network, an emergency message button selectable by a user, and a processing unit in communication with the user interface and emergency message button. The processing unit may be configured to generate and send an emergency message to a public safety answering point in response to a user selecting the emergency message button.

24 Claims, 5 Drawing Sheets

(56) References Cited

U.S. PATENT DOCUMENTS

| | | | |
|---|---|---|---|
| 6,631,184 B1 | 10/2003 | Weiner | |
| 6,636,732 B1 | 10/2003 | Boling et al. | |
| 6,690,932 B1 | 2/2004 | Barnier et al. | |
| 7,026,925 B2 | 4/2006 | Roche et al. | |
| 7,079,627 B2 | 7/2006 | Crago et al. | |
| 7,095,733 B1 | 8/2006 | Yarlagadda et al. | |
| 7,231,218 B2 | 6/2007 | Diacakis et al. | |
| 7,269,413 B2 | 9/2007 | Kraft | |
| 7,391,784 B1 | 6/2008 | Renkel | |
| 7,418,087 B2 | 8/2008 | Luneau et al. | |
| 7,444,238 B1 | 10/2008 | Opitz | |
| 7,496,189 B2 | 2/2009 | Clarisse et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 8,364,117 B2 | 1/2013 | Hawkins | |
| 8,428,548 B2 | 4/2013 | Ray et al. | |
| 8,472,916 B2 | 6/2013 | Coppage et al. | |
| 8,489,062 B2 | 7/2013 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1* | 2/2002 | Sheynblat et al. | 455/574 |
| 2002/0068584 A1 | 6/2002 | Gage et al. | |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0122779 A1* | 7/2003 | Martin et al. | 345/156 |
| 2003/0133450 A1 | 7/2003 | Baum | |
| 2003/0162554 A1 | 8/2003 | Kim | |
| 2004/0029610 A1* | 2/2004 | Ihira et al. | 455/550.1 |
| 2004/0056770 A1 | 3/2004 | Metcalf | |
| 2004/0063439 A1 | 4/2004 | Glazko et al. | |
| 2004/0072583 A1* | 4/2004 | Weng | 455/456.3 |
| 2004/0113836 A1 | 6/2004 | Rickerson, Jr. | |
| 2004/0157564 A1* | 8/2004 | Murakami et al. | 455/76 |
| 2004/0176123 A1 | 9/2004 | Chin et al. | |
| 2004/0185871 A1 | 9/2004 | Somani et al. | |
| 2004/0198329 A1 | 10/2004 | Vasa | |
| 2004/0258216 A1 | 12/2004 | Reid | |
| 2005/0003797 A1 | 1/2005 | Baldwin | |
| 2005/0048947 A1 | 3/2005 | Holland et al. | |
| 2005/0070315 A1 | 3/2005 | Rai et al. | |
| 2005/0085257 A1* | 4/2005 | Laird et al. | 455/550.1 |
| 2005/0097380 A1 | 5/2005 | Kim | |
| 2005/0101287 A1 | 5/2005 | Jin et al. | |
| 2005/0111630 A1 | 5/2005 | Potorny et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0239477 A1 | 10/2005 | Kim et al. | |
| 2005/0265326 A1 | 12/2005 | Laliberte | |
| 2005/0277405 A1 | 12/2005 | Noguchi | |
| 2006/0009243 A1 | 1/2006 | Dahan et al. | |
| 2006/0052134 A1 | 3/2006 | Sato | |
| 2006/0056620 A1 | 3/2006 | Shingal et al. | |
| 2006/0133582 A1 | 6/2006 | McCulloch | |
| 2006/0145841 A1 | 7/2006 | Daurensan et al. | |
| 2006/0152373 A1 | 7/2006 | King | |
| 2006/0166685 A1 | 7/2006 | Adkins | |
| 2006/0217105 A1 | 9/2006 | Kumar et al. | |
| 2006/0217136 A1 | 9/2006 | Bantukul et al. | |
| 2006/0219542 A1 | 10/2006 | Savir | |
| 2006/0222151 A1 | 10/2006 | Goldman et al. | |
| 2006/0227122 A1 | 10/2006 | Proctor | |
| 2006/0229100 A1 | 10/2006 | Born | |
| 2006/0238384 A1* | 10/2006 | Hess et al. | 340/995.14 |
| 2006/0276168 A1 | 12/2006 | Fuller et al. | |
| 2006/0293024 A1 | 12/2006 | Benco et al. | |
| 2007/0001902 A1 | 1/2007 | Kuo et al. | |
| 2007/0003024 A1 | 1/2007 | Olivier et al. | |
| 2007/0082652 A1* | 4/2007 | Hartigan et al. | 455/404.2 |
| 2007/0201391 A1 | 8/2007 | Belmonte et al. | |
| 2007/0201645 A1 | 8/2007 | Gass et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0001734 A1* | 1/2008 | Stilp et al. | 340/539.22 |
| 2008/0013696 A1 | 1/2008 | Motley et al. | |
| 2008/0057944 A1 | 3/2008 | Miriyala et al. | |
| 2008/0057987 A1 | 3/2008 | Landschaft et al. | |
| 2008/0070553 A1 | 3/2008 | Yamakawa et al. | |
| 2008/0122929 A1 | 5/2008 | Chukwu | |
| 2008/0220715 A1 | 9/2008 | Sinha et al. | |
| 2008/0227427 A1 | 9/2008 | Kadavallur et al. | |
| 2008/0254810 A1 | 10/2008 | Fok et al. | |
| 2008/0273670 A1 | 11/2008 | Dickinson | |
| 2008/0275950 A1 | 11/2008 | Jordan | |
| 2008/0287748 A1 | 11/2008 | Sapounas et al. | |
| 2008/0310850 A1 | 12/2008 | Pederson et al. | |
| 2009/0047924 A1 | 2/2009 | Ray et al. | |
| 2009/0064039 A1 | 3/2009 | Lee et al. | |
| 2009/0121930 A1 | 5/2009 | Bennett et al. | |
| 2009/0131072 A1 | 5/2009 | Razdan et al. | |
| 2009/0144157 A1 | 6/2009 | Saracino et al. | |
| 2009/0149153 A1 | 6/2009 | Lee | |
| 2009/0186596 A1 | 7/2009 | Kaltsukis | |
| 2009/0197567 A1 | 8/2009 | Ogram | |
| 2009/0215428 A1 | 8/2009 | Noldus et al. | |
| 2009/0227225 A1 | 9/2009 | Mitchell et al. | |
| 2009/0233573 A1 | 9/2009 | Gray | |
| 2009/0310602 A1 | 12/2009 | Olshansky et al. | |
| 2010/0098062 A1 | 4/2010 | Croak et al. | |
| 2010/0291894 A1 | 11/2010 | Pipes | |
| 2013/0115909 A1 | 5/2013 | Hawkins | |

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

ANSI, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 11/430,232.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.
U.S. Appl. No. 12/257,717; Final Rejection dated Jan. 23, 2012; 16 pages.
U.S. Appl. No. 12/257,717; Non-Final Rejection dated Sep. 13, 2011; 19 pages.
U.S. Appl. No. 12/257,725; Final Rejection dated Jan. 17, 2012; 17 pages.
U.S. Appl. No, 12/257,725; Non-Final Rejection dated Jul. 19, 2011; 26 pages.
U.S. Appl. No. 12/257,640; Non-Final Rejection dated Jan. 4, 2012; 19 pages.
U.S. Appl. No. 12/257,640; Final Rejection dated Aug. 17, 2011; 17 paces.
U.S. Appl. No. 12/257,655; Final Rejection dated Sep. 16, 2011; 22 pages.
U.S. Appl. No. 12/257,655; Amendment and Request for Continued Examination dated Dec. 16, 2011; 18 pages.
U.S. Appl. No. 12/070,775; Non-Final Rejection dated Jul. 25, 2011; 33 pages.
U.S. Appl. No. 12/257,836 Non-Finai Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No, 12/257,687; Non-Final Rejection dated May 10, 2011; 14 pages.
U.S. Appl. No. 12/257,687; Final Rejection dated Sep. 29, 2011: 12 pages.
U.S. Appl. No. 12/257,736; Non-Final Rejection dated Apr. 28, 2011; 15 pages.
U.S. Appl. No. 12/257,736; Final Rejection dated Nov. 23, 2011; 18 pages.
U.S. Appl. No. 12/257,736; Amendment and Request for Continued Examination dated Feb. 22, 2012; 12 pages.
U.S. Appl. No. 12/257,416; Final Rejection dated Jul. 14, 2011; 17 Pages.
U.S. Appl. No. 12/257,416; Non-Final Rejection dated Feb. 3, 2012; 24 pages.
U.S. Appl. No. 12/070,775; Final Rejection dated May 14, 2012; 27 pages.
U.S. Appl. No. 12/257,416; Final Rejection dated Jun. 13, 2012; 38 pages.
U.S. Appl. No. 12/257,640; Final Rejection dated May 2, 2012; 18 pages.
U.S. Appl. No. 12/257,655; Non-Final Rejection dated Jul. 17, 2012; 26 pages.
U.S. Appl. No. 12/257,836; Final Rejection dated May 14, 2012; 26 pages.
U.S. Appl. No. 12/070,775; Notice of Allowance dated Sep. 12, 2012; 24 pages.
U.S. Appl. No. 12/257,687; Final Rejection dated Aug. 31, 2012; 19 pages.
U.S. Appl. No. 121257,717; Non-Final Rejection dated Aug. 16, 2012; 42 pages.
U.S. Appl. No. 12/257,836; Non-Final Rejection dated Sep. 12, 2012; 25 pages.
U.S. Appl. No. 12/070,775; Issue Notification dated Jan. 9, 2013; 1 page.
U.S. Appl. No. 12/257,640; Non-Final Rejection dated Dec. 5, 2012; 23 pages.
U.S. Appl. No. 12/257,655; Final Rejection dated Jan. 2, 2013; 18 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,717; Notice of Allowance dated Feb. 14, 2013: 35 pages.
U.S. Appl. No. 12/257,725; Notice of Allowance dated Dec. 24, 2012; 24 pages.
U.S. Appl. No. 12/257,836; Notice of Allowance dated Mar. 12, 2013; 31 pages.
U.S. Appl. No. 13/712,669; Non-Final Rejection dated Mar. 27, 2013; 34 pages.
U.S. Appl. No. 12/257,725; Issue Notification dated Apr. 3, 2013; 1 page.
U.S. Appl. No. 12/257,640; Final Rejection dated Arp. 15, 2013; 21 pages.
U.S. Appl. No. 12/257,655; Notice of Allowance dated Apr. 16, 2013; 15 pages.
U.S. Appl. No. 12/257,416; Non Final Office Action dated May 22, 2013; 40 pages.
U.S. Appl. No. 12/257,687; Issue Notification dated Jun. 5, 2013; 1 page.
U.S. Appl. No. 12/257,836; Issue Notification dated Jun. 26, 2013; 1 page.

* cited by examiner

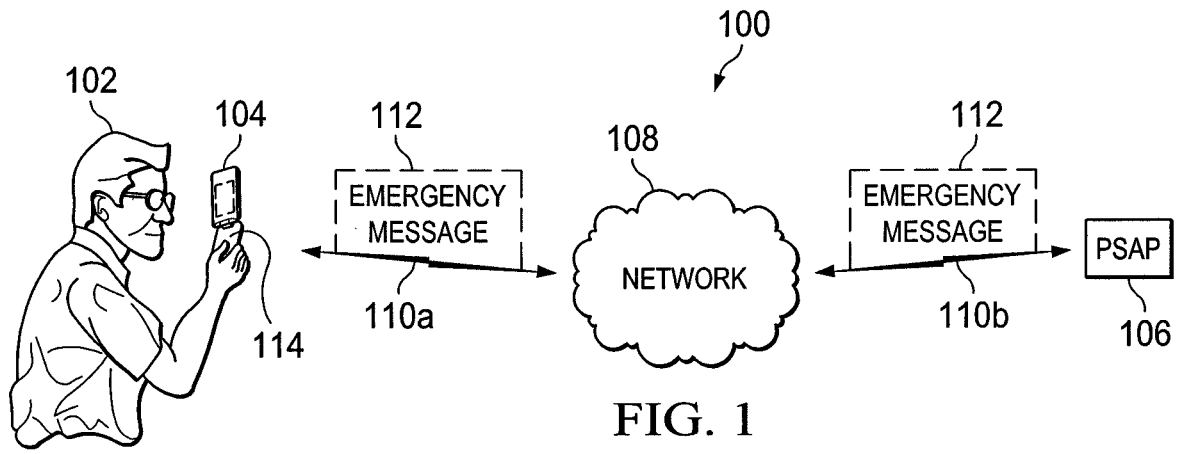
FIG. 1
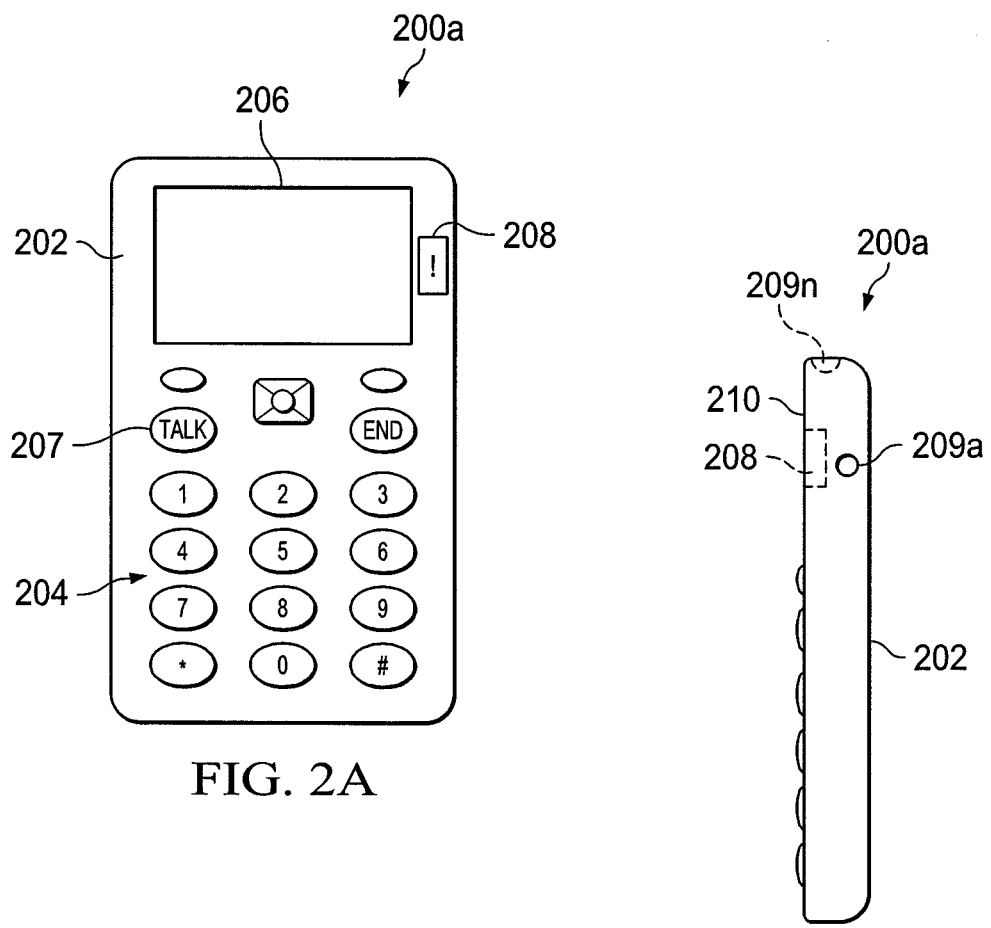
FIG. 2A
FIG. 2B

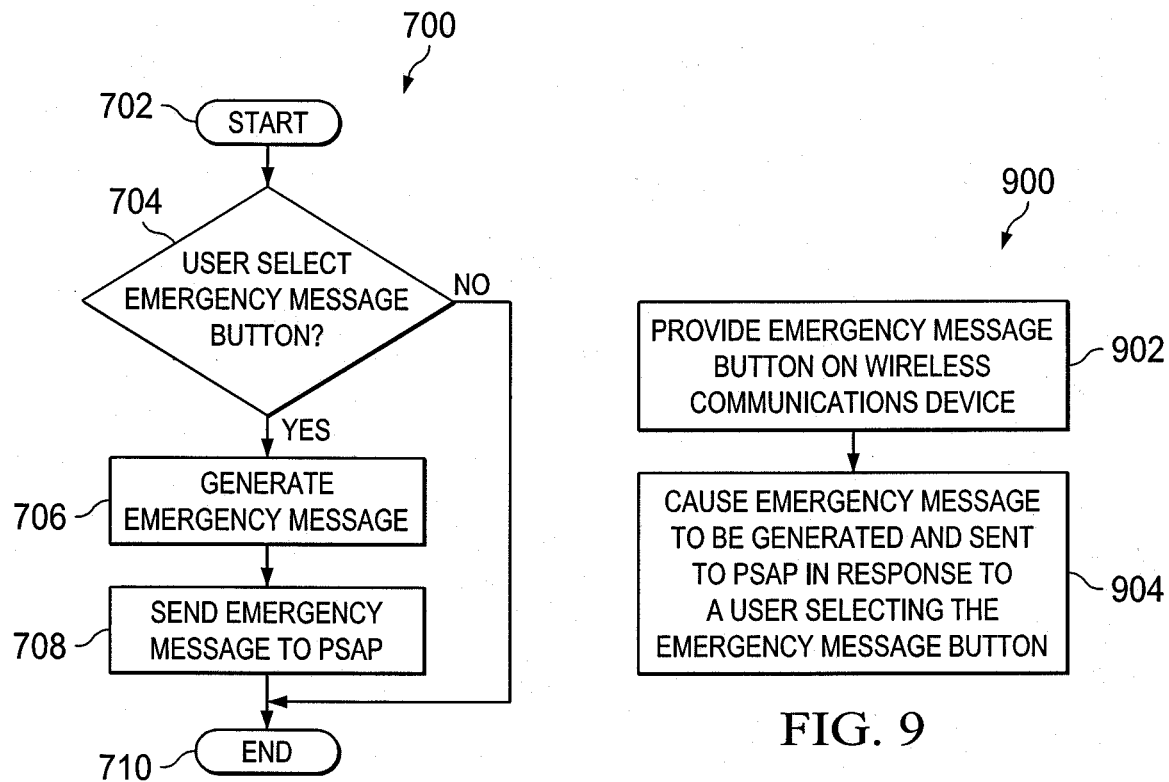
FIG. 7
FIG. 9
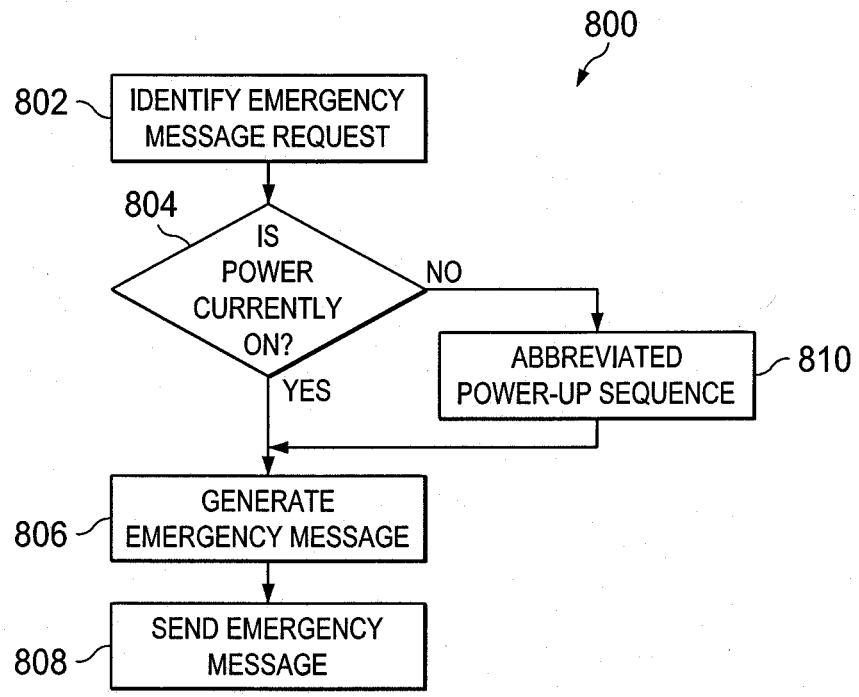
FIG. 8

EMERGENCY MESSAGE BUTTON AND METHOD ON A WIRELESS COMMUNICATIONS DEVICE FOR COMMUNICATING AN EMERGENCY MESSAGE TO A PUBLIC SAFETY ANSWERING POINT (PSAP)

CROSS REFERENCE TO RELATED APPLICATIONS

This application claims priority to co-pending Provisional Patent Application Ser. No. 61/078,123 filed on Jul. 3, 2008; the entire teachings of which are incorporated herein by reference.

BACKGROUND OF THE INVENTION

Telecommunications devices have advanced in a wide variety of ways. As telecommunications networks have improved and expanded functionality, telecommunications devices have followed. For example, wireless devices were developed to enable users to communicate text messages using short message service (SMS), instance messages (IM), and e-mails. Other technological functionality has also been developed for wireless communications devices.

Emergency situations can arise in a variety of ways at unpredictable times. Emergencies may come in the form of weather, crime, illness, natural disasters, man-made disasters, car accidents, and so forth. In an emergency situation, public safety answering points (PSAPs) have been established throughout the United States to answer emergency calls placed to "911." Emergency operators at the PSAPs have been trained to answer emergency calls and provide emergency response by the most suitable emergency response team (e.g., firemen, police, ambulance, etc.) that the emergency situation warrants. Emergency calls, however, are not always possible depending upon the situation. Poor wireless network coverage, need to remain silent so as to avoid being discovered, being in a noisy environment, and having a low battery are a limited set of illustrative reasons as to why emergency voice calls are not always possible.

SUMMARY

To overcome the problems of requesting emergency personnel support in situations where an emergency voice call is not possible or desirable, the principles of the present invention provide for emergency messaging to be provided to users of mobile devices and wireless communications devices. To simplify and expedite emergency messaging for users of a wireless communications devices, an emergency message button may be available on the wireless communications device so that, in response to selection of the emergency message button, an emergency message is generated and sent to a public safety answering point over a communications network. The emergency message button may be a hard-button or soft-button.

One embodiment of a wireless communications device according to the principles of the present invention includes a housing, a user interface configured to enable a user to type text messages for communication over a communications network, an emergency message button selectable by a user, and a processing unit in communication with the user interface and emergency message button. The processing unit may be configured to generate and send an emergency message to a public safety answering point in response to a user selecting the emergency message button.

One embodiment of a method for enabling a user to send an emergency message from a wireless communications device includes providing an emergency message button on the wireless communications device, and, in response to a user selecting the emergency message button, causing an emergency message to be generated and sent to a public safety answering point.

BRIEF DESCRIPTION OF THE DRAWINGS

Illustrative embodiments of the present invention are described in detail below with reference to the attached drawing figures, which are incorporated by reference herein and wherein:

FIG. 1 is an illustrative network environment configured to enable a user to communicate emergency messages to a public safety answering point;

FIGS. 2A-2D ate illustrations of illustrative wireless communications devices configured with emergency message buttons for initiating and communicating an emergency message to a public safety answering point;

FIG. 7 is a flow diagram of an illustrative process for identifying a user request to generate and send an emergency message;

FIG. 8 is a flow diagram of an illustrative process for identifying a user request to generate and communicate an emergency message to a public safety answering point; and FIG. 9 is a flow diagram of an illustrative process for providing an emergency message button on a wireless communications device for initiating an emergency message to be generated and communicated.

DETAILED DESCRIPTION OF THE DRAWINGS

Figure 2C:
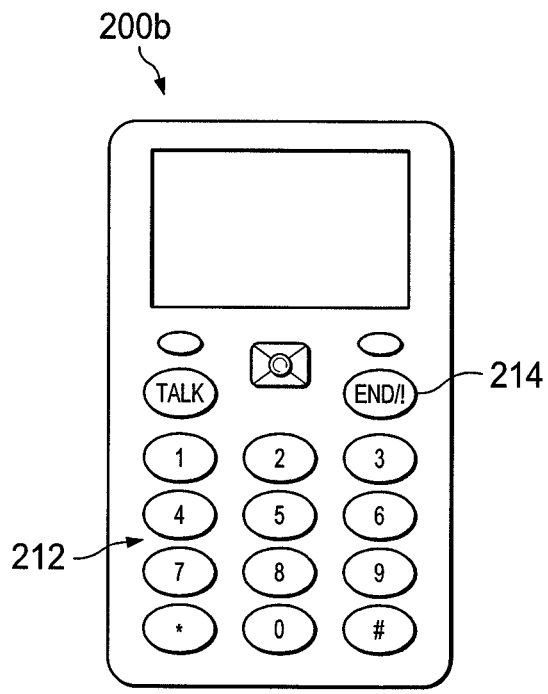

With regard to FIG. 1, a user 102 of a wireless communications device 104 may have a need for communicating with a public safety answering point (PSAP) 106 in an emergency situation. The wireless communications device 104 may be a mobile telephone, personal digital assistant (PDA), wireless electronic game, multi-mode telephone, or other electronic devices capable of communicating emergency data messages (EDMs) to public safety answering points (PSAPs). The wireless communications device 104 may communicate with the PSAP 106 over a communications network 108. The communications network 108 may include one or more communications networks, including mobile communications networks, the Internet, public switched telephone network (PSTN), or other communications network over which the wireless communications device 104 may communicate with the PSAP 106. The wireless communications device 104 may communicate over a wireless communications path 110a with the network 108 and the PSAP 106 may communicate with the network 108 over a communications path 110b, which may be wireless or wired.

In the event of an emergency, the user 102 may utilize the wireless communications device 104 to communicate an emergency message 112 over the network 108 to the PSAP 106. The emergency message 112 traditionally has been a telephone call, but in accordance with the principles of the present invention, the emergency message 112 may be a (i) text message using short message service (SMS), (ii) prerecorded message stored on the wireless communications device 104, (iii) instant message, or any other text or non-text message that may be initiated by the user 102 selecting an emergency message button 114 on the wireless communications device 104, as further described herein.

With regard to FIG. 2A, a wireless communications device 200a includes a housing 202 and user interface 204. The user interface is shown as a keypad, but as understood in the art, the user interface may alternatively be a touch screen or combination thereof. The wireless communications device 200a further includes an electronic display 206 on which information, such as telephone numbers being called or received, are displayed. In addition, an emergency message button 208 may be disposed on the housing in a convenient place for a user to activate an emergency message. In being disposed on the housing, the emergency message button 208 actually passes through or is mounted to the housing 202 and is positioned in a location at which the user may access the emergency message button 208 without having to open any portion of the housing 202. In an alternative embodiment, the emergency message button 208 may be covered by a portion of the housing or other structure (e.g., repositionable flap or cover (not shown)) that can be removed or displaced to enable a user to access the emergency message button 208. As shown, the emergency message button 208 is a hard-button or key that operates in the same or similar manner as buttons or keys of the user interface 204. For example, the emergency message button 208 may be depressible for a user to initiate an emergency message. Alternatively, the emergency message button 208 may be an electronic touch sensor that identifies that a user has contacted the emergency message button 208.

In one embodiment, rather than a user simply having to activate the emergency message button 208 to initiate an emergency message, the wireless communications device 200a may be configured to have the user activate the emergency message button 208 and talk button 207, or any other button, substantially simultaneously to initiate the emergency message. By having the user press both buttons 208 and 207, the ability for the user to inadvertently send an emergency text message to a PSAP is minimal. In an alternative embodiment, both buttons can be activated at different times, such as pressing the emergency message button 208 first and then the talk button 207 to confirm desire to send the emergency message.

One or more illumination devices 209a-209n (collectively 209) may be positioned on the wireless communications device 200a. In one embodiment, one or more of the illumination devices 209 are LEDs. Another illumination device is the electronic display 206. One of the illumination devices 209a may be positioned to illuminate the emergency message button in response to an emergency message being communicated. Other illumination devices 209 may be illuminated, strobed or otherwise used to indicate successfully communicating an emergency message.

With regard to FIG. 2B, the emergency message button 208 is shown to be recessed within the housing 202 so as to minimize the chance of a user inadvertently pressing the emergency message button 208. In being recessed, the housing 208 may have a protrusion (not shown) around the emergency message button 208 or the emergency message button 208 may be recessed with respect to a surface of the housing 202.

With regard to FIG. 2C, a wireless communications device 200b is shown to be configured with a user interface 212 that includes a multi-purpose button 214 that may be utilized to (i) end a telephone call, (ii) turn on the wireless communications device 200b, (iii) turn off the wireless communications device 200b, and (iv) request an emergency message to be communicated to a PSAP. The wireless communications device 200b may be configured to distinguish between a user's actions of the multi-purpose button 214 so as to avoid communicating an emergency message inadvertently. It should be understood that alternative buttons other than an on/off power button may be utilized.

Figure 2D:
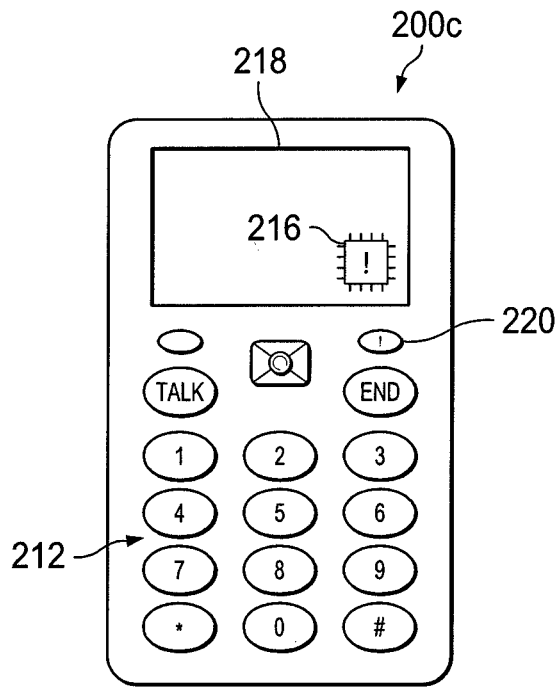

With regard to FIG. 2D, a wireless communications device 200c may be configured to display a soft-button 216 on an electronic display 218 that may be selectable by a user to initiate and communicate an emergency message. If electronic display 218 is a touch screen (i.e., an electronic display that senses a user touching a portion of the electronic display), then the user may activate the soft-button 216 by pressing his or her finger to the electronic display 218 at a region defined by the soft-button 216. Alternatively, the user may select a hard-button 220 associated with the soft-button 216 to initiate an emergency message from the wireless communications device 200c.

Figure 3A:
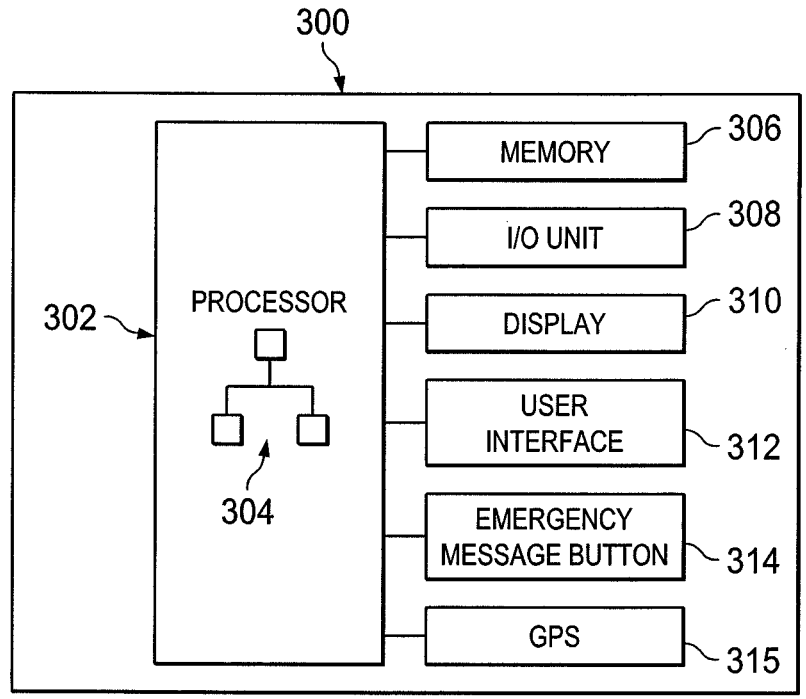
FIG. 3A is a block diagram of an illustrative wireless communications device configured with an emergency message button for generating and communicating an emergency message.

With regard to FIG. 3A, a wireless communications device 300 may include a processing unit 302 that executes software 304. The software may include conventional communications functionality as well as functionality for generating and communicating an emergency message to a public safety answering point. The processing unit 302 may be in communication with a memory 306 that is configured to store data and software, and input/output (I/O) unit 308 that includes wireless communications devices, as understood in the art. The processing unit 302 may further be in communication with an electronic display 310, user interface 312, and emergency message button 314. The electronic display 310 may be configured to display information to a user using the wireless communications device 300. The user interface 312 may enable a user to place telephone calls and/or send text messages via a keypad or otherwise. The emergency message button 314 may be a hard-key that a user may press to initiate an emergency message to be generated and communicated by the software 304. Alternatively, the emergency message button 314 may be a soft-button generated by the processing unit 312 and displayed on the electronic display 310, and enable a user to request an emergency message to be generated and communicated by selection thereof. In one embodiment, the wireless communications device 300 includes GPS circuitry 315, may be utilized to generate geographic coordinates for the processing unit 302 to include in an emergency message, such as an emergency text message, if available.

Figure 3B:
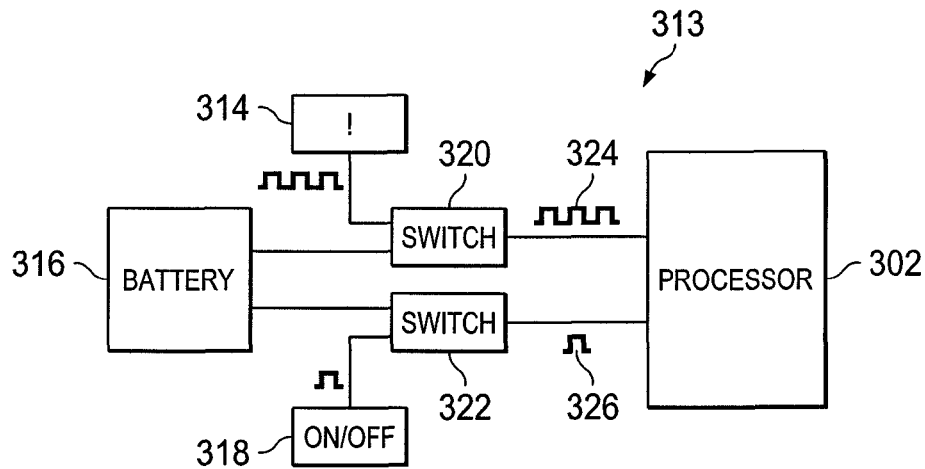
FIG. 3B is a block diagram of an illustrative circuit within the wireless communications device of FIG. 3A for powering-up the wireless communications device using both standard and emergency power-up sequences.

With regard to FIG. 3B, an illustrative circuit 313 is shown to include the emergency message button 314, battery 316, and on/off button 318. Two switches 320 and 322 are configured to switch and generate turn-on signals 324 and 326, respectively, when a user activates the emergency message button 314 or on/off button 318. As shown, the turn-on signal 324 is toggled three times, thereby representing a user selecting the emergency message button 314 three times within a second, which may be a pre-established activation sequence to cause the wireless communications device to activate an emergency power-up sequence. In an alternative embodiment, the emergency message button 314 and on/off button 318 may be the same hard-buttons. In such a configuration, the processing unit 302 may determine whether the user intended to turn on the wireless communications device using a standard power-up sequence or an emergency power-up sequence by determining whether the user activated the on/off button using a pre-established activation sequence.

Figure 4:
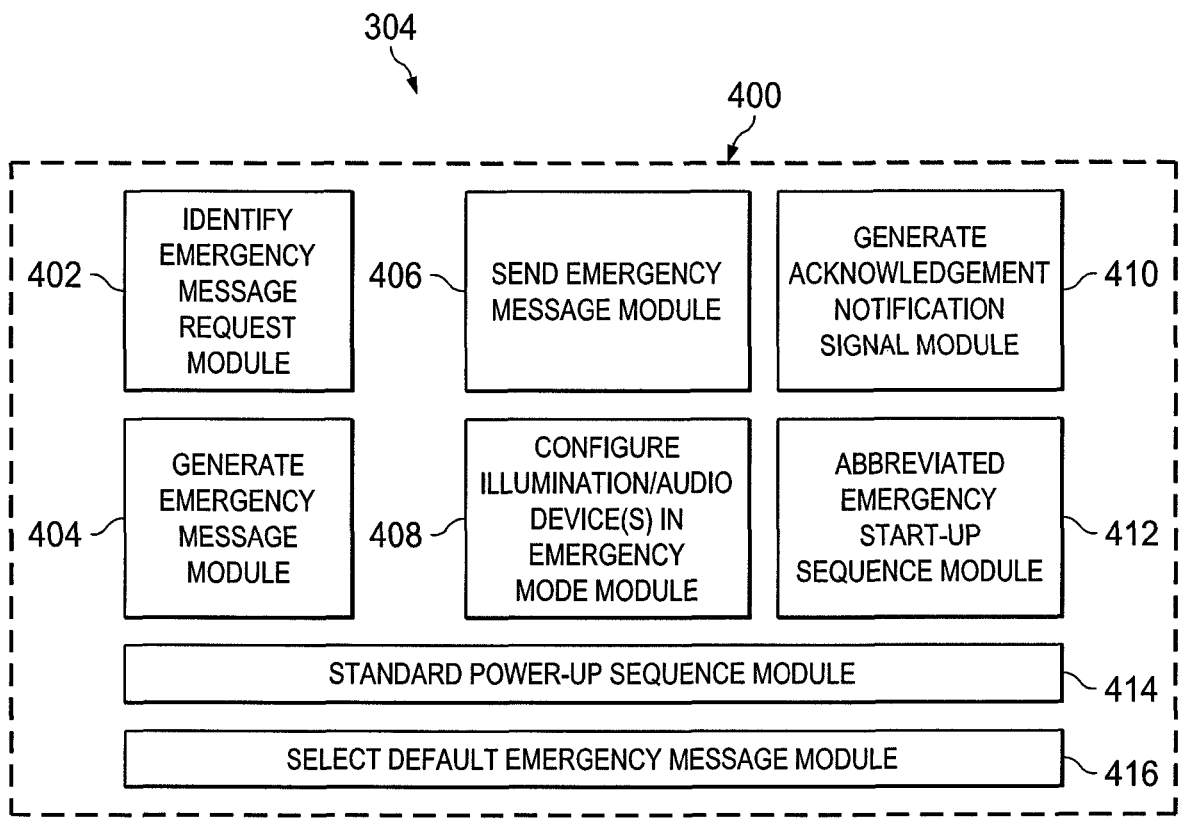
FIG. 4 is a block diagram of illustrative modules that can be executed on the wireless communications device of FIG. 3A.
Figure 5:
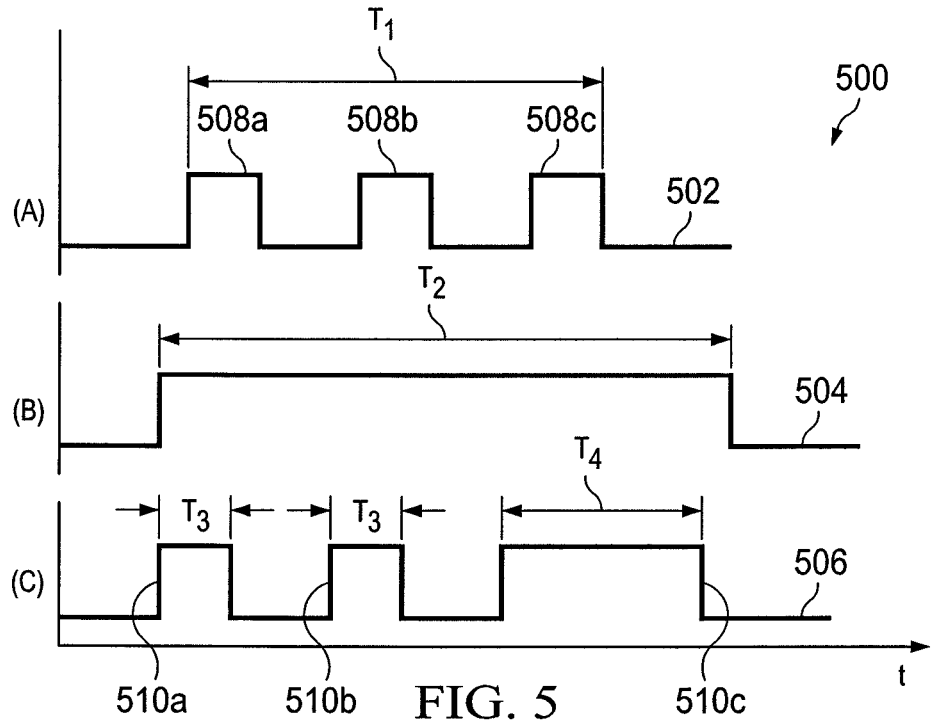
FIGS. 5A-5C are signal diagrams showing illustrative emergency request signals with different activation sequences for initiating an emergency message to be communicated to a public safety answering point.

With regard to FIG. 4, modules 400, which may be software modules of software 304 of FIG. 3A, may be configured to identify a request from a user to generate and communicate an emergency message. Alternatively, one or more of the modules 400 may be hardware modules. An identify emergency message request module 402 may be configured to identify when a user requests an emergency message to be communicated to a public safety answering point. In identifying the emergency message request, the identify emergency message request module 402 may monitor a hard-button or soft-button, depending on the configuration of the wireless communication device in which the modules 400 are being executed. The identify emergency message request module 402 may monitor an emergency message key (e.g., emergency message key 208 of FIG. 2A), to identify a particular sequence that a user presses the emergency message key, as further described with regard to FIG. 5.

A generate emergency message module 404 may be configured to generate (i) a text message for use in sending to a PSAP, (ii) prerecorded voice message, or (iii) speech synthesized voice message. If an emergency text message is generated, the emergency text message may include information about the user and geographical location of the user, including "send to" address, name, home address, telephone number, geographic coordinates (e.g., global positioning system (GPS) coordinates), and other information that can be fit into a text message. If the emergency message is a prerecorded voice message, then the emergency message may be stored in memory of the wireless communications device and played to an operator at a PSAP. The prerecorded voice message may be recorded by the user to provide the PSAP operator with any information that could be helpful to police in the event of an emergency, such as the name of a known stalker. If the emergency message is a speech synthesized message, then the wireless communications device may store data in memory for use in generating an emergency message by a speech synthesizer executed by the wireless communications device that converts the stored data into synthesized speech for audio presentation to an operator at a PSAP. Both the pre-recorded and speech synthesized messages may have information, such as GPS coordinates, added at the time of a call to a PSAP by the wireless communications device in response to the user activating the emergency message button.

A send emergency message module 406 may be configured to send the generated emergency message to a PSAP. If the emergency message is a prerecorded message or a speech synthesized message, then the send emergency message module 406 may automatically call 911 or send a text message to an address (e.g., "emergency.org") for routing to a local PSAP. It should be understood that non-preformatted messages as understood in the art, may be sent by a user to a network address for routing to a PSAP.

A configure illumination/audio device(s) in emergency mode module 408 may be configured to set at least one component into an emergency mode, such as by reducing or eliminating illumination of an electronic display and other illumination devices (e.g., LEDs) of a wireless communications device and significantly lower volume of the wireless communications device (e.g., reduce by 60 dB) of audio device(s) of the wireless communications device. By reducing or turning off illumination and audio devices (i.e., setting the wireless communications device in an emergency mode), a user who requests an emergency message to be sent to a PSAP may be protected in the event that the user is hiding from an intruder who might otherwise discover the user's presence should the wireless device be illuminated or produce an audible sound. In the event that the user desires to turn sound and illumination device(s) back on, the configure illumination/audio device(s) in emergency mode module 408 may turn on the illumination and audio device(s) on in response to the user selecting a button, such as the user-on button or otherwise.

A generate acknowledgement notification signal module 410 may be configured to notify the user that an emergency message has been sent to a PSAP by generating an acknowledgement indicator or acknowledgement notification signal, such as a visual signal. The acknowledgement indicator may be a low-level light by illuminating an LED to light the emergency message button, for example. In an alternative embodiment, the acknowledgement notification signal may be white text or graphics displayed a black background on an electronic display of the wireless communications device, where the white text or graphics indicates that the emergency message was communicated to the PSAP (e.g., "emergency message sent"). In one embodiment, if a successful receipt is received from the PSAP, in addition to notifying the user that the emergency message was communicated, a receipt acknowledgement notification signal may cause an illumination device, such as an LED or electronic display, to change colors, flash a different number of times than the acknowledgement notification signal, or any other indicator to notify the user that the PSAP received the message and help is being sent.

An abbreviated emergency startup sequence module 412 may be configured to start-up or turn on the wireless communications device in an abbreviated manner if an emergency message is requested to be sent while the wireless communications device is turned off. The wireless communications device may execute the abbreviated emergency start-up sequence module 412 to turn on a limited number of components, such as a processing unit, I/O unit, memory, wireless transmission devices, and other devices without turning on an electronic display or other illumination devices to limit the amount of power consumed by the wireless communications device and to quickly generate and communicate an emergency message.

A standard power-up sequence module 414 may be configured to power-up the wireless communications device in a standard or normal manner. The standard power-up sequence module 414 performs a routine power-up, including turning-on the electronic display.

With regard to FIGS. 5A-5C, three illustrative user request signals 502, 504, and 506, respectively, are displayed. The user request signal 502 includes three pulses 508a-508c (collectively 508) that occur within a time period $T_1$. In one embodiment, the wireless communication device may be configured to identify that an emergency request is made if a user selects an emergency message button three times to produce the three pulses 508 within a given time period, such as one second. By using a sequence, such as three presses of a button within a second, false emergency message requests may be minimized to avoid emergency messages being sent when a user has the wireless communication device in his or her pocket, handbag, or otherwise. As shown in FIG. 5B, an emergency request signal 504 is shown to be activated for $T_2$ seconds. In one embodiment, the wireless communications device may use a pre-established or predetermined sequence for a user to press an emergency message button for two seconds or longer for an emergency request to be generated and sent to a PSAP. In yet another embodiment, as shown in FIG. 5C, the emergency message signal 506 is shown to include three pulses 510a-510c, where the first two pulses have the same duration of $T_3$ and the last pulse 510c has a duration of $T_4$ (i.e., short-short-long). Having a predetermined sequence that is irregular may further minimize inadvertent emergency message requests.

Figure 6:
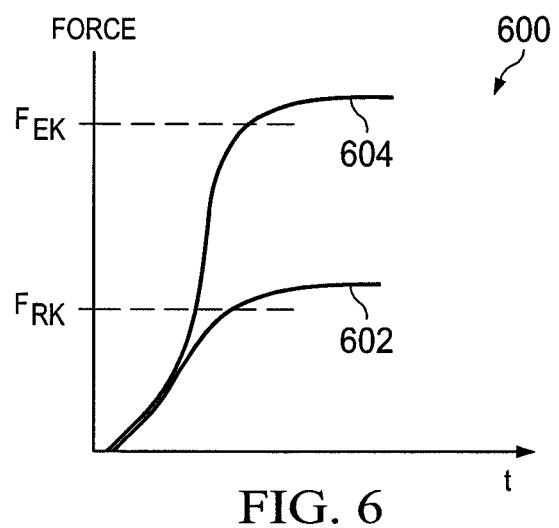
FIG. 6 is a graph of illustrative force signals associated with regular keys and an emergency key for use in initiating an emergency message.

With regard to FIG. 6, two force signals 602 and 604 ate shown, where force signal 602 represents an amount of force that a regular key of a user interface requires to activate the regular key (e.g., alphanumeric key) and force signal 604 represents the amount of force required for a user to activate an emergency key. In one embodiment, an emergency key threshold force ($F_{EK}$) is at least two times the amount of regular key threshold force ($F_{RK}$). By using an emergency key that requires a user to apply more force than a regular key to reach a threshold force to activate the emergency key, the user is less likely to inadvertently request an emergency message to be communicated to a PSAP and activate the emergency message key by an intentional act. It should be understood that alternative embodiments may have an emergency key that requires the same or less force than a regular key for activation.

With regard to FIG. 7, an illustrative process 700 for generating and communicating an emergency message to a PSAP is provided. The process 700 starts with step 702. At step 704, a determination as to whether a user has selected an emergency message button is performed. If the user has selected an emergency message button, then at step 706, an emergency message is generated. The emergency message may be a pre-established text message, audio message, or speech synthesized message. Each of the emergency messages may contain the telephone number of the wireless communications device, home address, current GPS coordinates, and/or other information associated with the user. At step 708, the emergency message may be sent or otherwise communicated to the PSAP. In sending the emergency message to the PSAP, the wireless communications device may communicate the emergency message using a wireless communications protocol for a particular type of message, as understood in the art. For example, if the emergency message is a text message, then the wireless communications device may use SMS. If, alternatively, the message is a prerecorded voice message, then the wireless communications device may communicate over a voice communications channel, as understood in the art. The process ends at step 710. If, at step 704, a determination is made that the user has not selected an emergency message button, then the process ends at step 710.

With regard to FIG. 8, a process 800 may be used to respond to a user request for generating and communicating an emergency message in both power-on and power-off states of a wireless communications device. The process 800 starts at step 802, where an emergency message request is identified. In identifying an emergency message request, a determination is made as to whether an emergency message button has been selected a pre-determined sequence (e.g., three selections within one second). In identifying that the emergency message request has been made, at step 804, a determination as to whether power of the wireless communications device is currently on may be made by hardware, software, or firmware. If so, then at step 806, an emergency message is generated and sent at step 808. Alternatively, if the power of the wireless communication device is not currently on, then an abbreviated power-up sequence may be performed at step 810 prior to generating and sending an emergency message at steps 806 and 808, respectively. The abbreviated power-up sequence may limit electronic devices within the wireless communications device to turn on so as to accelerate generation and communication of the emergency message. If the communications device is configured to send an emergency message in response to activation of an emergency message button, then the wireless communications device may be configured to turn off with sufficient battery life, such as five percent, to send at least one emergency message or be configured with an emergency battery to be maintained in the event that an emergency message is requested to be sent after battery life of a primary battery has been exhausted.

With regard to FIG. 9, an illustrative process 900 provides for a wireless communications device with an emergency message button. At step 902, an emergency message button is provided on a wireless communications device. The emergency message button may be a hard-button or a soft-button. At step 904, an emergency message is caused to be generated and sent to a PSAP in response to a user selecting the emergency message button. In sending the message to a PSAP, if the emergency message is an emergency text message, the emergency text message may be communicated to a central site (e.g., "emergency.gov") to route the emergency text message to a local PSAP. If the emergency message is a prerecorded or speech synthesized message, a call to "911" may be placed in response to the emergency message button being activated by a user automatically (i.e., single button call).

Although the emergency message button has been described for use on a wireless communications device, it should be understood that the principles of the present invention could be applied to other wireless devices, such a voice over Internet protocol (VoIP) telephones, portable game consoles (e.g., Nintendo DS), or fixed game consoles, such as x-box, where network connectivity exists. Still yet, the principles of the present invention could be applied to wired communications devices, such as telephones. Furthermore, the term button is representative of any device, such as a switch, knob, wheel, or otherwise, that can be utilized to interact with the wireless communications device.

Although the principles of the present invention have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skills in this art will immediately envisage the methods and variations used to implement this invention in other areas than those described in detail. The following claims set forth a number of the embodiments of the invention disclosed with greater particularity.

The invention claimed is:

1. A wireless communications device, comprising:
a housing;
a user interface disposed on said housing configured to enable a user to type text messages for communication over a communications network;
at least one illumination device comprising an electronic display;
an emergency message button selectable by a user; and
a processing unit in communication with said user interface and emergency message button, and configured to:
determine whether a user has selected said emergency message button, based on a determination that a force applied to the emergency message button exceeds a first threshold force, wherein the first threshold force is greater than a second threshold force required to actuate the user interface for typing text messages;
generate and send an emergency message to a public safety answering point in response to a determination that a user has selected said emergency message button; and
in further response to the determination that a user has selected said emergency message button, set said at least one illumination device into an emergency mode, the emergency mode reducing or eliminating illumination of said at least one illumination device; and
display an acknowledgement notification signal of the selection of the emergency message button as text on a black background on the electronic display.

2. The wireless communications device according to claim 1, wherein said emergency message button is a hard-button disposed on said housing.

3. The wireless communications device according to claim 2, wherein said emergency message button is recessed with respect to a surface of said housing.

4. The wireless communications device according to claim 1, wherein said emergency message button is a soft-button displayed on said electronic display.

5. The wireless communication device according to claim 1, wherein said processing unit is configured to identify a predetermined sequence of activations by the user to indicate an intentional emergency request.

6. The wireless communications device according to claim 5, wherein the predetermined sequence is three activations within one second of time.

7. The wireless communications device according to claim 1, wherein said emergency message button also functions as a power on/off button.

8. The wireless communications device according to claim 1, wherein said processing unit is further configured to generate and send an emergency message to a public safety answering point in response to a user selecting said emergency message button and another button substantially simultaneously.

9. The wireless communications device according to claim 1, wherein said emergency message button has a first threshold force for activation that is higher than a second threshold force for activation of buttons of said user interface.

10. The wireless communications device according to claim 1, wherein said processing unit is further configured to:
determine whether the wireless communications device is currently powered on; and
in response to determining that the wireless communications device is currently powered on, perform an abbreviated power-up sequence.

11. The wireless communications device according to claim 10, wherein the abbreviated power-up sequence includes turning on a limited number of components of the wireless communications device.

12. The wireless communications device according to claim 1, wherein said processing unit is further configured to lower or eliminate volume of the wireless communications device.

13. A method for enabling a user to send an emergency message from a wireless communications device, said method comprising:
providing an emergency message button on the wireless communications device;
determining whether a user has selected said emergency message button, based on a determination that a force applied to the emergency message button exceeds a first threshold force, wherein the first threshold force is greater than a second threshold force required to actuate a non-emergency button on the wireless communications device for typing text messages; and
in response to a determination that a user has selected the emergency message button,
causing an emergency message to be generated and sent to a public safety answering point; and
setting at least one illumination device into an emergency mode, the illumination device comprising an electronic display, the emergency mode reducing or eliminating illumination of said at least one illumination device; and
displaying an acknowledgement notification signal of the selection of the emergency message button as text on a black background on the electronic display.

14. The method according to claim 13, wherein providing an emergency message button includes providing a hard-button.

15. The method according to claim 14, wherein providing the hard-button includes providing a recessed hard-button.

16. The method according to claim 13, wherein providing an emergency message button includes providing a soft-button displayed on the wireless communications device.

17. The method according to claim 13, further comprising identifying user selection of the emergency message button by identifying a predetermined sequence of activations by the user to indicate an intentional emergency request.

18. The method according to claim 17, wherein the predetermined sequence is three activations within one second of time.

19. The method according to claim 13, further comprising providing an emergency message button including enabling a power on/off button to additionally function as an emergency notification button.

20. The method according to claim 13, wherein causing an emergency message to be generated is in response to the user selecting the emergency message button and another button substantially simultaneously.

21. The method according to claim 13, further comprising turning on and off at least one illumination device in response to the emergency message being sent to notify the user that the emergency text message was sent.

22. The method according to claim 13, further comprising:
determining whether the wireless communications device is currently powered on; and in response to determining that the wireless communications device is currently powered on, performing an abbreviated power-up sequence.

23. The method according to claim 22, wherein performing the abbreviated power-up sequence includes turning on a limited number of components of the wireless communications device.

24. The method according to claim 13, further comprising lowering or eliminating volume of the wireless communications device.

* * * * *